(12) United States Patent
Cargo

(10) Patent No.: US 8,210,862 B1
(45) Date of Patent: Jul. 3, 2012

(54) WATER-PROOF COVER FOR ELECTRICAL CONNECTORS

(76) Inventor: Brandon J. Cargo, Concord, CA (US)

( * ) Notice: Subject to any disclaimer, the term of this patent is extended or adjusted under 35 U.S.C. 154(b) by 0 days.

(21) Appl. No.: 13/134,874

(22) Filed: Jun. 20, 2011

(51) Int. Cl.
*H01R 13/52* (2006.01)

(52) U.S. Cl. ........................................................ 439/278

(58) Field of Classification Search .......... 439/278–282, 439/652, 733.1
See application file for complete search history.

(56) References Cited

U.S. PATENT DOCUMENTS

| | | | | |
|---|---|---|---|---|
| D233,729 S | * | 11/1974 | De Forrest | D8/353 |
| 4,556,758 A | * | 12/1985 | Warden | 174/50 |
| 4,952,756 A | * | 8/1990 | Meyers | 174/67 |
| 5,035,298 A | * | 7/1991 | Noxon | 181/295 |
| 5,354,953 A | * | 10/1994 | Nattel et al. | 174/54 |
| 5,664,955 A | * | 9/1997 | Arnett | 439/135 |
| 5,773,760 A | * | 6/1998 | Stark et al. | 174/66 |
| 6,159,034 A | * | 12/2000 | Royer | 439/373 |
| 2002/0182936 A1 | * | 12/2002 | Fowler | 439/652 |
| 2010/0137775 A1 | * | 6/2010 | Hu et al. | 602/54 |
| 2010/0174250 A1 | * | 7/2010 | Hu et al. | 604/319 |
| 2010/0213099 A1 | * | 8/2010 | Meneses | 206/701 |

\* cited by examiner

*Primary Examiner* — Tulsidas C Patel
*Assistant Examiner* — Phuongchi Nguyen
(74) *Attorney, Agent, or Firm* — Thomas R. Lampe

(57) ABSTRACT

A cover for an electrical connector including a plug and a receptacle includes a water-proof sheet having adhesive secured to a sheet outer peripheral portion, the adhesive forming a water-tight seal with electrical cords of the plug and receptacle, and the cover forming a water-tight seal completely surrounding the connected plug and receptacle.

19 Claims, 2 Drawing Sheets

WATER-PROOF COVER FOR ELECTRICAL CONNECTORS

TECHNICAL FIELD

This invention relates to a water-proof cover for electrical connectors, and more particularly to a disposable, single use, water-proof cover for extending completely about a connected electric plug and receptacle.

BACKGROUND OF THE INVENTION

It is of course highly undesirable to expose electrical connectors such as connected electrical plugs and receptacles to moisture. Exposure of these connectors to rain and other sources of moisture can create a hazardous situation, even if ground fault interrupters are employed in the electrical circuit. If a GFI is in the circuit even relatively minor contact between an electrical connector and moisture can trigger the GFI. This is a common problem, for example, when holiday and other types of outdoor lighting are involved.

Individuals have attempted to solve the water incursion problem by wrapping electrical connectors with plastic bags or sheets and taping the wrapped plastic bag or sheet in place about the connector. This practice is generally unsuccessful since it does an inadequate job of keeping water from the connector, particularly where rain or water sprays apply a considerable amount of water. It is almost impossible to prevent water from leaking into the connector using this approach since it does not create effective water-proof seals.

It is also known to utilize molded plastic members clamped at the ends of two connector elements, such as a receptacle and electrical plug, which cooperate to form a seal. However, such arrangements are not only costly, they do not adapt to different sizes and configurations of connector components. Even in situations where the molded plastic clamp structures are sized correctly relative to the connector components, the seals created are often not good enough to provide true waterproofing of the electrical connector. Then too, this type of prior art device is relatively expensive and may be somewhat difficult to install correctly or quickly.

DISCLOSURE OF INVENTION

The present invention, in contrast to the prior art, is relatively simple, inexpensive and easy to use. The cover of the invention is disposable after use. It is also highly effective as a water-proof barrier for electrical connectors, in particular those connectors including at least one electric plug and a receptacle releasably connected together. When in place at an electrical connector, effective seals are formed which prevent the intrusion of water into engagement with the connector. A single size of the cover of the present invention may be used with many types and sizes of connector.

The cover of the present invention includes a double-sided sheet of water-proof material that extends completely about a connected electric plug and receptacle, around the plug electrical cord adjacent to the electric plug and around the receptacle electrical cord adjacent to the receptacle.

The water-proof cover is adhesively secured to the plug electrical cord and to the receptacle electrical cord by adhesive on the sheet forming water-tight seals completely about the plug electrical cord and the receptacle electrical cord.

The water-proof cover defines a cover interior accommodating the electric plug and receptacle and forms a water-tight seal extending between the water-tight seals formed at the plug electrical cord and the receptacle electrical cord alongside the electric plug and receptacle.

Other features, advantages and objects of the present invention will become apparent with reference to the following description and accompanying drawings.

MODES FOR CARRYING OUT THE INVENTION

Figure 1:
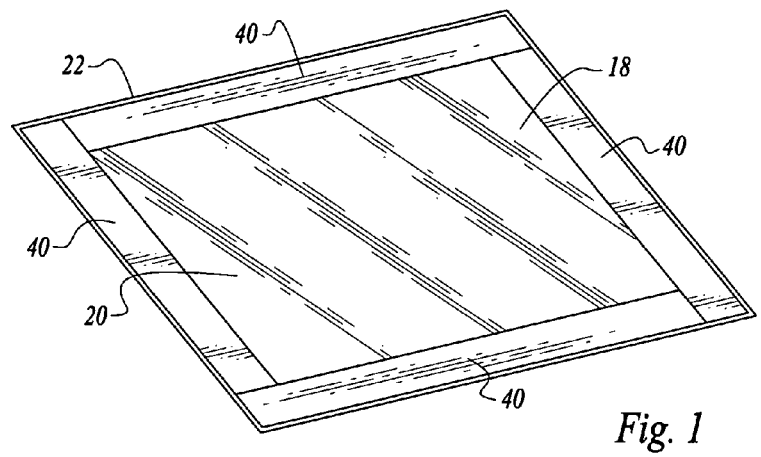
FIG. 1 is a perspective view illustrating a first embodiment of cover constructed in accordance with the teachings of the present invention.

Referring now to FIGS. 1-5, an electrical connector including a conventional electric plug 10 and a conventional receptacle 12 is illustrated. The electric plug has a plug electrical cord 14 attached thereto and the receptacle has a receptacle electrical cord 16 attached thereto, as is conventional.

Also illustrated in FIGS. 1-5 is a water-proof cover constructed in accordance with the teachings of the present invention. The cover includes a double-sided sheet 18 of water-proof material, suitably plastic sheet material. The illustrated sheet 18 is transparent and has a central portion 20 and an outer peripheral portion 22 extending completely about the central portion.

An adhesive 24 of any suitable type is located on one side of the double-sided sheet on the outer peripheral portion and extends along the entire outer peripheral portion 22. The applied adhesive may be of any suitable commercially available type having the ability to be applied with sufficient thickness to conform to irregular surfaces, high viscosity for dimensional stability, pressure sensitive, water-proof and easily removable to leave little or no residue. The central portion 20 is free of adhesive.

The outer peripheral portion 22 includes first and second pairs of outer peripheral portion segments. The segments 26, 28 of the first pair of outer peripheral segments portion segments are spaced from one another. The segments 30, 32 are spaced from one another and are orthogonally disposed relative to segments 26, 28. In this first embodiment of the invention, the sheet 18 is rectangular and, more specifically, a square. The outer peripheral portion also has a rectangular configuration.

Figure 2:
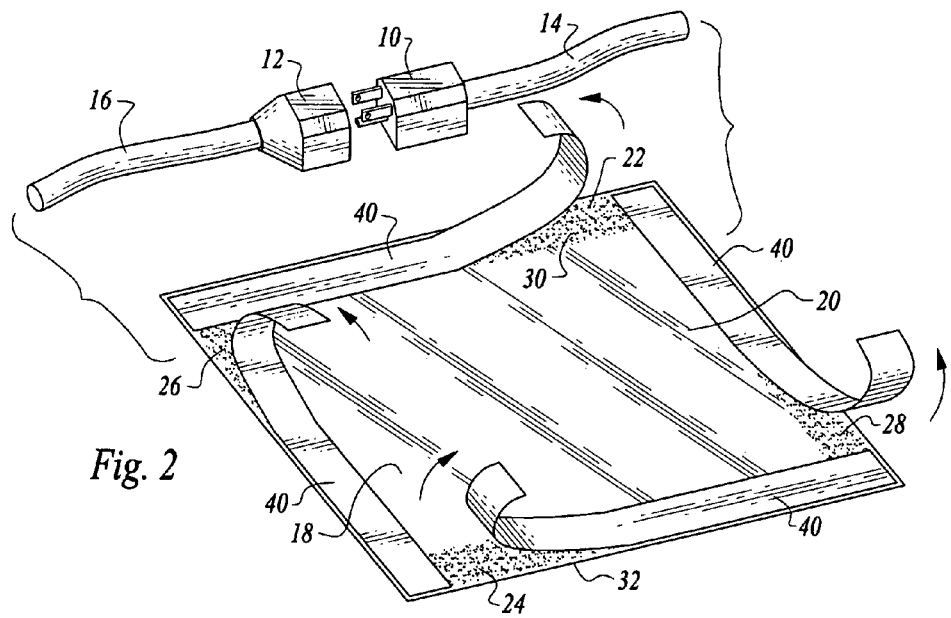
FIG. 2 is a perspective view of the first embodiment positioned adjacent to an electric plug and receptacle prior to their interconnection and also illustrating adhesive cover elements of the cover being removed prior to installation of the cover at the electrical connector.

Referring to FIGS. 1 and 2, the adhesive 24 is covered by adhesive cover elements 40 which cover the adhesive to protect the adhesive until the cover is ready to use. FIG. 2 shows the adhesive cover elements in the process of being removed from the adhesive at the outer peripheral portion 22.

Figure 3:
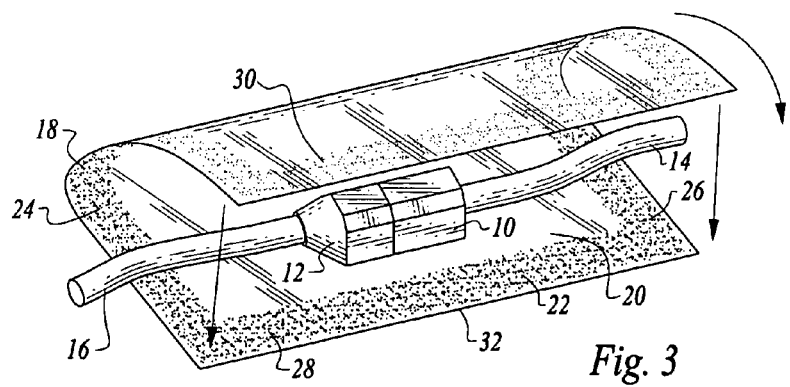
FIG. 3 illustrates the cover in the process of being folded to envelope the electric plug and receptacle, the adhesive covers having been removed.

FIG. 3 shows the connected electric plug 10 and receptacle 12 positioned on the adhesive free central portion 20 of the sheet 18. The cords of the plug and receptacle extend outwardly beyond the ends of the sheet.

Figure 4:
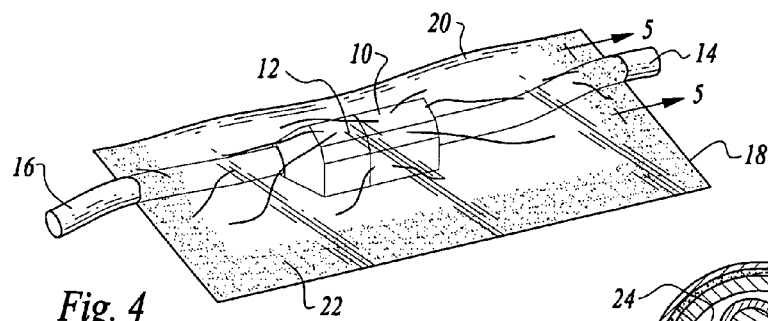
FIG. 4 illustrates the cover completely covering the plug and receptacle, seals being created about the cords of the plug and receptacle and also alongside the electrical connector.
Figure 5:
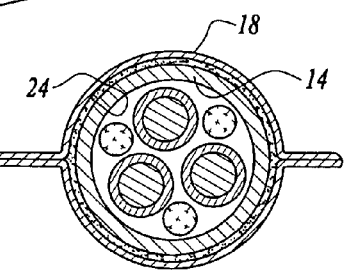
FIG. 5 is an enlarged, cross-sectional view taken along line 5-5 in FIG. 4.

The next step in the completion of the cover is to fold the sheet in half as is being initiated in FIG. 3 and is shown completed in FIG. 4. The folded over cover is pressed by hand to form a secure adhesive water-tight seal about the electrical cord of the plug and the electrical cord of the receptacle and completely surrounding the cords with the adhesive on the superposed halves of segments 26, 28. In addition, the segments 30, 32 are superimposed and pressed into engagement to complete the seal by forming a water-tight seal alongside but spaced from the connected plug and receptacle. The connected electrical plug and receptacle have a combined length and the sheet 18 has a length somewhat greater than the combined length of the connected electrical plug and receptacle. Furthermore, the sheet has a width exceeding twice the circumferences of the plug and receptacle.

After use, the cover can be cut, removed from the electrical connector and disposed of.

Figure 6:
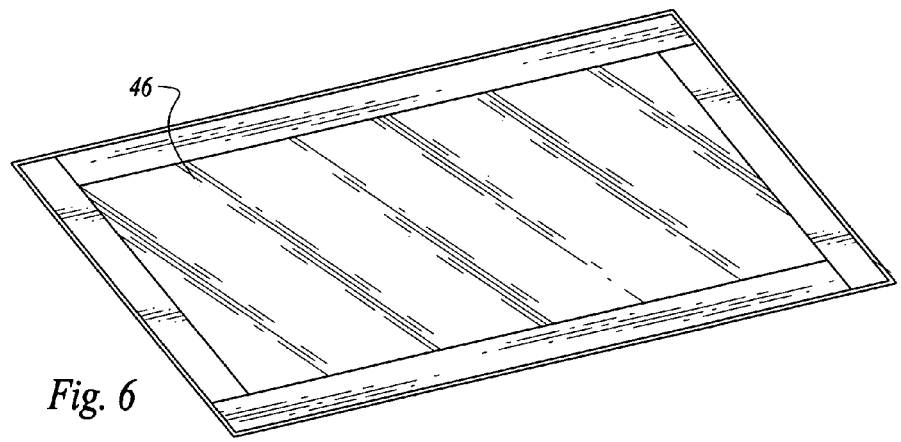
FIG. 6 is a perspective view similar to FIG. 1, but illustrating a second embodiment of the invention.
Figure 7:
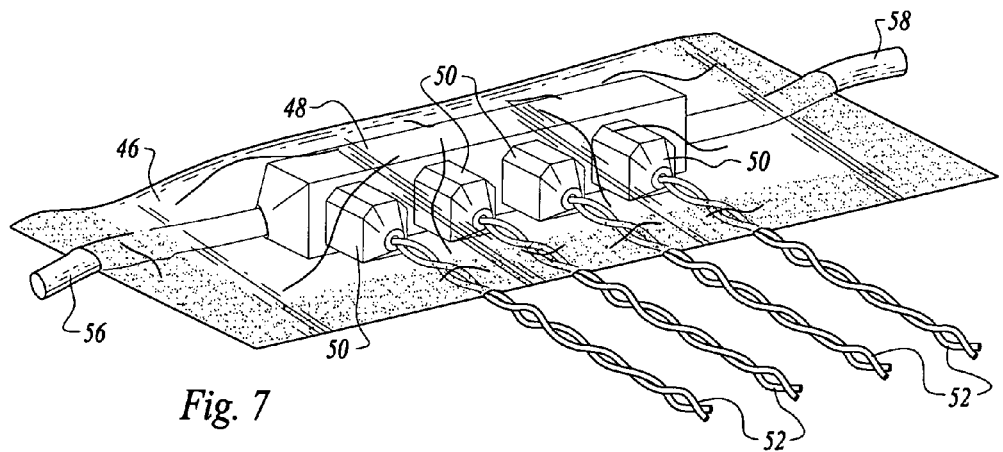
FIG. 7 illustrates the cover of the second embodiment installed in place relative to a receptacle having four electric plugs connected thereto, water-tight seals being formed about electrical cords of all four plugs as well as alongside the receptacle to create a water-proof interior accommodating the receptacle and electric plugs.

Referring now to FIGS. 6 and 7, a second embodiment of the cover of this invention is illustrated. In this embodiment the sheet 46 is elongated. The receptacle 48 within the interior of the closed cover is also elongated and is connected to four plugs 50, each of which has a plug electrical cord 52. This illustrated receptacle has an electrical cord extending from each end thereof, the cords being identified by reference numerals 56, 58. The adhesive of the cover is pressed firmly into engagement with both the receptacle cords and the plug cords, forming a water-tight seal completely about the receptacle and plugs.

The invention claimed is:

1. In combination:
   an electrical connector including an electric plug having a plug electrical cord attached thereto and a receptacle releasably connected to said electric plug, said receptacle having a receptacle electrical cord attached thereto; and
   a water-proof cover extending completely about said connected electric plug and receptacle, around said plug electrical cord adjacent to said electric plug, and around said receptacle electrical cord adjacent to said receptacle, said water-proof cover being adhesively secured to said plug electrical cord and to said receptacle electrical cord by adhesive on said cover to form water-tight seals completely about said plug electrical cord and said receptacle electrical cord, said water-proof cover defining a cover interior accommodating said electric plug and receptacle and forming a water-tight seal extending between the water-tight seals formed at said plug electrical cord and said receptacle electrical cord.

2. The combination according to claim 1 wherein the electrical connector includes a plurality of electric plugs, each electric plug having a plug electrical cord, said water-proof cover adhesively secured to and forming a water-tight seal with each of said plug electrical cords.

3. The combination according to claim 1 wherein the receptacle has a plurality of receptacle electrical cords attached thereto, said water-proof cover adhesively secured to and forming a water-tight seal with each of the receptacle electrical cords.

4. The combination according to claim 1 wherein said cover comprises a double-sided sheet of water-proof material having a central portion and an outer peripheral portion extending completely about said central portion, said adhesive located at one side of said double-sided sheet on said outer peripheral portion and extending along the entire outer peripheral portion, said central portion being free of adhesive that would provide a direct adhesive attachment between said sheet and said electrical plug and receptacle.

5. The combination according to claim 4 wherein said central portion is folded about said electrical plug and receptacle to form said cover interior.

6. The combination according to claim 5 wherein said outer peripheral portion includes first and second pairs of outer peripheral portion segments, the segments of said first pair of outer peripheral portion segments being spaced from one another and adhesively secured to and surrounding said plug electrical cord and said receptacle electrical cord.

7. The combination according to claim 6 wherein the segments of said second pair of outer peripheral portion segments are adhesively secured together and extend between the spaced segments of said first pair of outer peripheral portion segments, the segments of said first and second pairs of segments preventing water from entering said cover interior.

8. The combination according to claim 4 wherein said sheet is rectangular and wherein said outer peripheral portion has a rectangular configuration.

9. The combination according to claim 8 wherein said sheet is square.

10. The combination according to claim 8 wherein said sheet is elongated.

11. The combination according to claim 10 wherein said water-proof material is plastic sheet material.

12. A water-proof cover for attachment to an electrical connector including an electric plug having a plug electrical cord attached thereto and a receptacle releasably connected to said electrical plug, said receptacle having a receptacle cord attached thereto, said connected electrical plug and receptacle having a combined length, said water-proof cover comprising a double-sided sheet of water-proof material having a length greater than the combined length of said connected electrical plug and receptacle and a width exceeding twice the circumferences of said electrical plug and said receptacle, said sheet having a central portion and an outer peripheral portion extending completely about said central portion, and adhesive on said outer peripheral portion extending along said outer peripheral portion, with said central portion being free of adhesive that would provide an adhesive attachment between said sheet and said electrical plug and receptacle, said central portion being larger than the combined length of said connected electric plug and receptacle, said sheet being manually deformable to enable folding of said sheet about said connected electrical plug and receptacle and into engagement with said plug electrical cord and said receptacle electrical cord to adhesively secure said cover to said plug electrical cord and said receptacle electrical cord and form a water-tight seal with said plug electrical cord and said receptacle electrical cord, and said water-tight seal extending between said plug electrical cord and said receptacle electrical cord adjacent to said connected electric plug and receptacle.

13. The water-proof cover according to claim 12 wherein said sheet is rectangular and wherein said outer peripheral portion has a rectangular configuration.

14. The water-proof cover according to claim 12 wherein said sheet is square.

15. The water-proof cover according to claim 12 wherein said sheet is elongated.

16. The water-proof cover according to claim 12 wherein said water-proof material is plastic sheet material.

17. The water-proof cover according to claim 12 additionally including adhesive cover elements removably connected to said adhesive.

18. The water-proof cover according to claim 12 wherein said outer peripheral portion includes first and second pairs of outer peripheral portion segments, the segments of said first pair of outer peripheral portion segments being spaced from one another and adhesively secured to and surrounding said plug electrical cord and said receptacle electrical cord.

19. The water-proof cover according to claim 18 wherein the segments of said second pair of outer peripheral portion segments extend between the spaced segments of said first pair of outer peripheral portion segments, the segments of said first and second pairs of segments for defining a cover interior accommodating said electric plug and said receptacle and preventing water from entering said cover interior.

* * * * *